United States Patent
Cai et al.

(10) Patent No.: US 8,515,457 B2
(45) Date of Patent: Aug. 20, 2013

(54) MONITORING SPEED OF A VEHICLE USING A MOBILE NETWORK

(75) Inventors: Yigang Cai, Naperville, IL (US);
Ranjan Sharma, New Albany, OH (US);
Shengqiang Wang, Cary, NC (US)

(73) Assignee: Alcatel Lucent, Paris (FR)

( * ) Notice: Subject to any disclaimer, the term of this patent is extended or adjusted under 35 U.S.C. 154(b) by 471 days.

(21) Appl. No.: 12/556,514

(22) Filed: Sep. 9, 2009

(65) Prior Publication Data
US 2011/0059754 A1   Mar. 10, 2011

(51) Int. Cl.
*H04W 24/00*   (2009.01)

(52) U.S. Cl.
USPC ............. 455/456.3; 455/456.1; 455/456.2; 701/412; 701/117; 340/441; 340/466; 340/988

(58) Field of Classification Search
USPC ............. 340/441, 466, 988; 701/412, 117; 455/456.1, 522, 456.3
See application file for complete search history.

(56) References Cited

U.S. PATENT DOCUMENTS

| | | | |
|---|---|---|---|
| 6,462,675 B1 | 10/2002 | Humphrey | |
| 7,397,365 B2 | 7/2008 | Wang | |
| 2001/0016488 A1 * | 8/2001 | Haymes et al. | 455/423 |
| 2001/0016489 A1 * | 8/2001 | Haymes et al. | 455/423 |
| 2007/0067086 A1 * | 3/2007 | Rothschild | 701/93 |
| 2008/0177459 A1 * | 7/2008 | Sutardja | 701/117 |
| 2008/0177467 A1 * | 7/2008 | Sutardja | 701/208 |
| 2008/0177470 A1 * | 7/2008 | Sutardja | 701/210 |
| 2009/0051518 A1 * | 2/2009 | Flick | 340/441 |
| 2009/0051519 A1 * | 2/2009 | Flick | 340/441 |
| 2009/0073030 A1 * | 3/2009 | Hansen et al. | 342/357.1 |
| 2010/0019891 A1 * | 1/2010 | Mudalige | 340/425.5 |
| 2010/0121526 A1 * | 5/2010 | Pham | 701/36 |
| 2010/0323715 A1 * | 12/2010 | Winters | 455/456.1 |

* cited by examiner

*Primary Examiner* — Joseph Arevalo
(74) *Attorney, Agent, or Firm* — Duft, Bornsen & Fettig, LLP

(57) ABSTRACT

Systems and methods are disclosed that monitor the speed that a mobile device is traveling, such as when the user of the mobile device is driving or riding in a vehicle. A speed monitoring system described herein receives a request from a third party to monitor a speed of a mobile device. The system periodically queries a mobile network for a location of the mobile device over a time period, and receives responses from the mobile network indicating locations of the mobile device. The system then determines a speed of the mobile device based on the locations indicated during the time period, and may determine the speed limit the roadway the mobile device is traveling on. The system then sends a notification message to the third party that includes an indication of the speed of the mobile device and possibly the speed limit.

16 Claims, 7 Drawing Sheets

MONITORING SPEED OF A VEHICLE USING A MOBILE NETWORK

BACKGROUND

1. Field of the Invention

The invention is related to the field of communications and, in particular, to monitoring the speed of a vehicle using a mobile network.

2. Statement of the Problem

Excessive speed on highways and other roadways has long been a problem in the United States and elsewhere, resulting in loss of life, injury, and millions of dollars in property loss on an annual basis. It has become an even greater problem as the number of vehicles in service has increased. Law enforcement officers are charged with enforcing the speed limits, but limited municipal budgets make it impossible to provide large numbers of traffic police.

Aside from government enforcement, some individuals or entities have an interest in knowing how certain vehicles are utilized, and in particular, whether vehicles are being used in a reckless manner through speeding. For example, parents may want to know whether their children are driving at a safe speed, or riding in a vehicle being driven at a safe speed. Also, companies that hire drivers, such as trucking companies, delivery companies, etc, may want to monitor the speed in which company vehicles are being driven. Even further, insurance companies may want to monitor the speed of a habitual speeder. The company may drop coverage or increase a premium upon determining yet another speeding violation.

SUMMARY

Embodiments described herein allow for monitoring the speed that a mobile device is travelling to consequently determine the speed that the user of the mobile device is travelling in a vehicle. A network-based system is able to monitor the speed that a mobile device (e.g., a cell phone) is travelling by communicating with a mobile network providing service to the mobile device, and to report the speed to a third party. For instance, a parent may request the system to monitor the speed that their child's mobile device is travelling, and in response, the system reports the speed back to the parent. The parent is thus able to identify how fast their child is driving or riding in a vehicle. The network-based system advantageously allows a third party to remotely monitor the speed of a vehicle without having to embed specialized hardware in the vehicle, as the speed may be determined through the mobile device carried by an occupant of the vehicle.

One embodiment comprises a speed monitoring system that communicates with a mobile network, such as a cellular network. The speed monitoring system includes a network interface operable to receive a request from a third party to monitor a speed of a mobile device. The speed monitoring system further includes a control system operable to periodically query the mobile network for a location of the mobile device over a time period, and to receive responses from the mobile network indicating locations of the mobile device during the time period. The control system is further operable to determine a speed of the mobile device based on the locations indicated during the time period, and may also determine the speed limit of the roadway the mobile device is traveling on based on the locations. The control system is further operable to send a notification message to the third party that includes an indication of the speed of the mobile device. By determining the speed that a mobile device is travelling, the third party is able to determine how fast the user of the mobile device is travelling in a vehicle. Thus, the third party can remotely monitor the speed of the vehicle through the mobile device.

Other exemplary embodiments may be described below.

DESCRIPTION OF THE DRAWINGS

Some embodiments of the present invention are now described, by way of example only, and with reference to the accompanying drawings. The same reference number represents the same element or the same type of element on all drawings.

DESCRIPTION OF EMBODIMENTS

The figures and the following description illustrate specific exemplary embodiments of the invention. It will thus be appreciated that those skilled in the art will be able to devise various arrangements that, although not explicitly described or shown herein, embody the principles of the invention and are included within the scope of the invention. Furthermore, any examples described herein are intended to aid in understanding the principles of the invention, and are to be construed as being without limitation to such specifically recited examples and conditions. As a result, the invention is not limited to the specific embodiments or examples described below, but by the claims and their equivalents.

Figure 1:
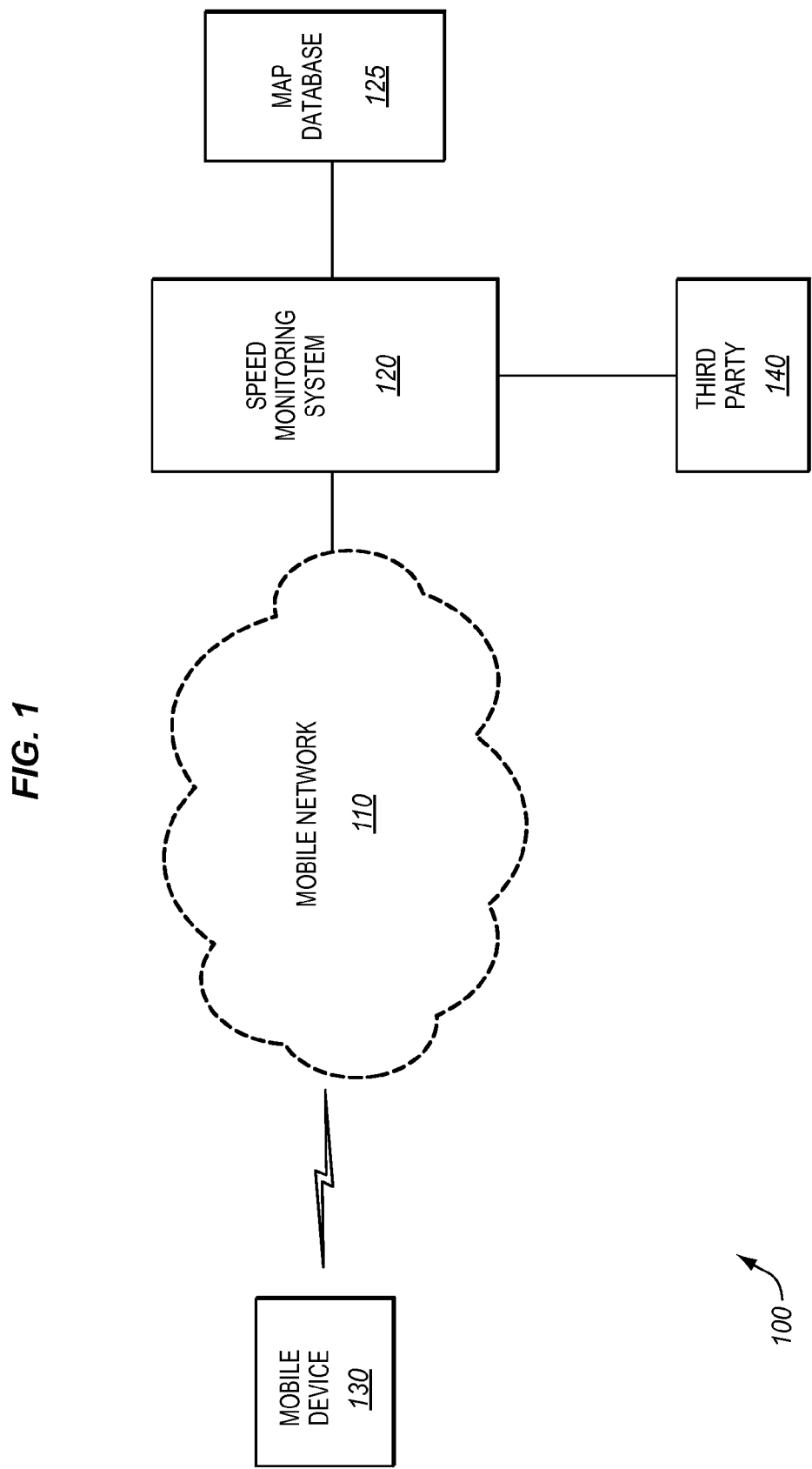
FIG. 1 illustrates a communication network in an exemplary embodiment.

FIG. 1 illustrates a communication network 100 in an exemplary embodiment. Communication network 100 includes a mobile network 110, a speed monitoring system 120, and a map database 125. Mobile network 110 comprises any network that provides communications to mobile devices via wireless signals. An example of mobile network 110 includes a cellular network, such as a CDMA network or a GSM network. In this embodiment, mobile network 110 provides mobile communications to mobile device 130. Mobile device 130 comprises any device operable to communicate via wireless signals, such as a mobile or cellular phone, a PDA, a PC, a mobile VoIP phone, etc.

Speed monitoring system 120 comprises any system, server, or application operable to monitor the speed or rate that mobile device 130 is travelling. Speed monitoring system 120 may be a server that is external to mobile network 110 and is operated by an independent entity that offers a speed monitoring service. Alternatively, speed monitoring system 120 may be a server implemented in mobile network 110 by the service provider to offer a speed monitoring service. For example, if the service provider operating mobile network 110 is Verizon Wireless, then Verizon may implement speed monitoring system 120 in its network to offer a speed monitoring service to its subscribers.

Map database 125 comprises any server or data structure operable to provide maps or a map service. For example, given a particular location (e.g., latitude/longitude), map database 125 may provide a map of a geographic area proximate to the location. Map database 125 may also provide speed limits of the roads in the geographic area. Although shown as separate, map database 125 may be integrated within speed monitoring system 120.

In the embodiments described below, speed monitoring system 120 is able to monitor the speed of mobile device 130, such as when the user of mobile device 130 is travelling in a vehicle. By monitoring the speed of mobile device 130, a third party 110 is able to monitor how fast a user of mobile device 130 is travelling in the vehicle. For example, third party 140 may be a parent that gave mobile device 130 to his/her child. Third party 140 may alternatively be a company that gave mobile device 130 to one of its drivers. One assumption is that third party 140 has some type of authoritative relationship over the user of mobile device 130, such as a family relationship, a business relationship, etc, so that third party 140 can legally monitor the speed of mobile device 130.

Figure 2:
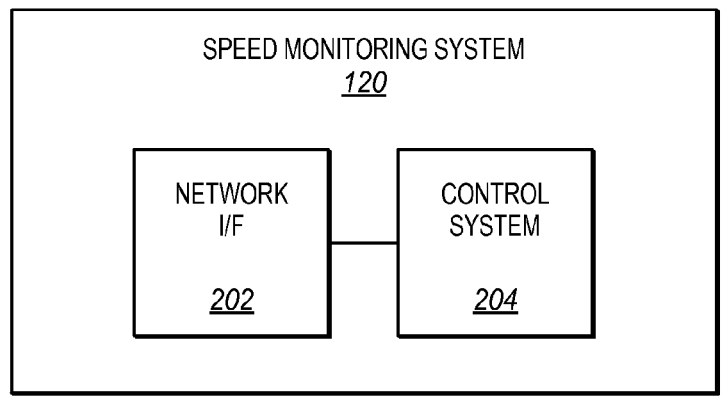
FIG. 2 illustrates a speed monitoring system in an exemplary embodiment.

FIG. 2 illustrates speed monitoring system 120 in an exemplary embodiment. In this embodiment, speed monitoring system 120 includes a network interface 202 and a control system 204. Network interface 202 comprises any device, component, or system configured to exchange messages with mobile network 110. The messages exchanged may comprise Lightweight Directory Access Protocol (LDAP) messages, Message Application Part (MAP) messages, ANSI-41 messages, Session Initiation Protocol (SIP) messages, etc. Control system 204 comprises any device, component, or system configured to monitor the speed of a mobile device by communicating with mobile network 110.

To initiate the speed monitoring service, third party 140 sends a request to speed monitoring system 120 to monitor the speed of mobile device 130. The request may include an identification for mobile device 130, such as its directory number. The request to speed monitoring system 120 may be sent over mobile network 110, such as a call, an SMS message, an MMS message, etc. The request may alternatively be sent in another way, such as an IP-based or web-based request sent over the internet. An exemplary operation of speed monitoring system 120 is described below in FIG. 3.

Figure 3:
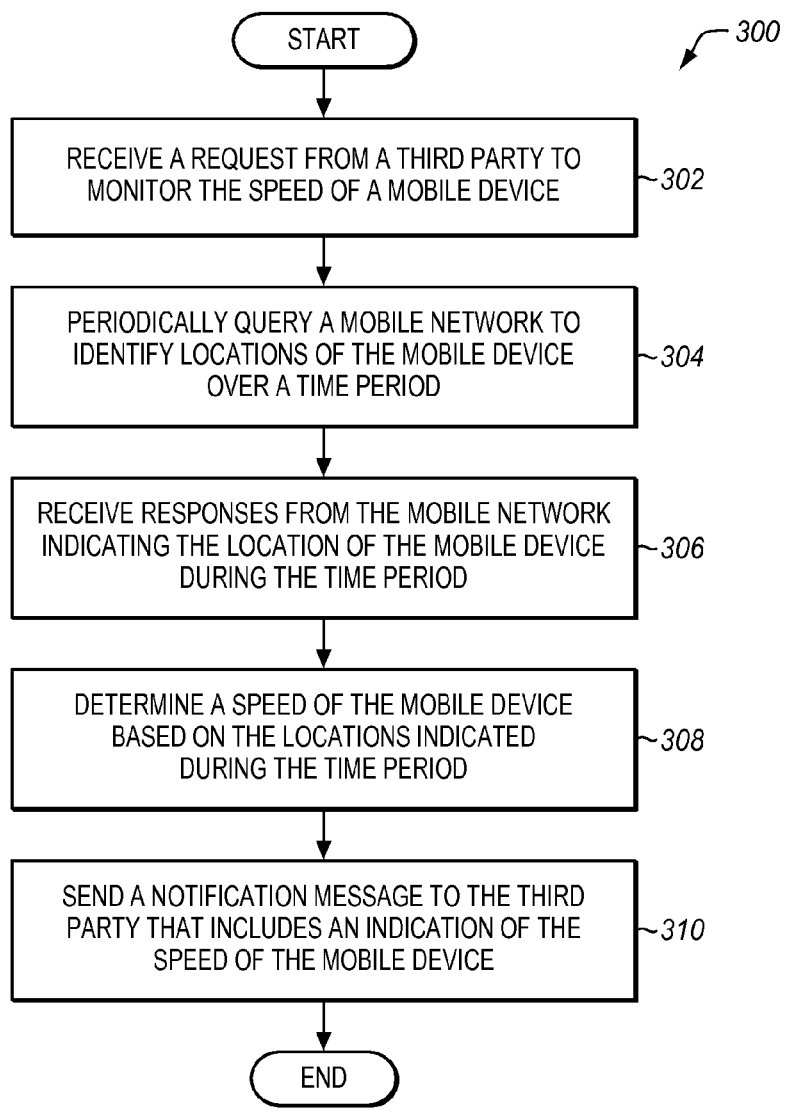
FIG. 3 is a flow chart illustrating a method of monitoring the speed of a mobile device in an exemplary embodiment.

FIG. 3 is a flow chart illustrating a method 300 of monitoring the speed of mobile device 130 in an exemplary embodiment. The steps of method 300 will be described with reference to communication network 100 in FIG. 1 and speed monitoring system 120 in FIG. 2, but those skilled in the art will appreciate that method 300 may be performed in other networks and systems. Also, the steps of the flow charts provided herein are not all inclusive and other steps, not shown, may be included. Further, the steps may be performed in an alternative order.

In step 302, network interface 202 receives the request from third party 140 to monitor the speed of mobile device 130. In step 304, control system 204 periodically queries mobile network 110 through network interface 202 to identify locations of mobile device 130 over a time period. Mobile network 110 may include a variety of functionalities for determining the present location of a mobile device. For example, a GSM/UMTS network may include a location server referred to as a Gateway Mobile Location Center (GMLC) that is able to determine the present location of mobile devices in its network. In another example, a CDMA network may include a location server referred to as a Mobile Positioning Center (MPC) that is able to determine the present location of mobile devices in its network. Control system 204 periodically queries the location server in mobile network 110 for locations of mobile device 130. The frequency of the queries is configurable.

In response to each query, mobile network 110 identifies the present location of mobile device 130, and sends responses to control system 204 (through network interface 202) indicating the present location of mobile device 130. The present location may be a latitude/longitude or some other location information. In step 306, control system 204 receives the responses from mobile network 110 through network interface 202.

Figure 4:
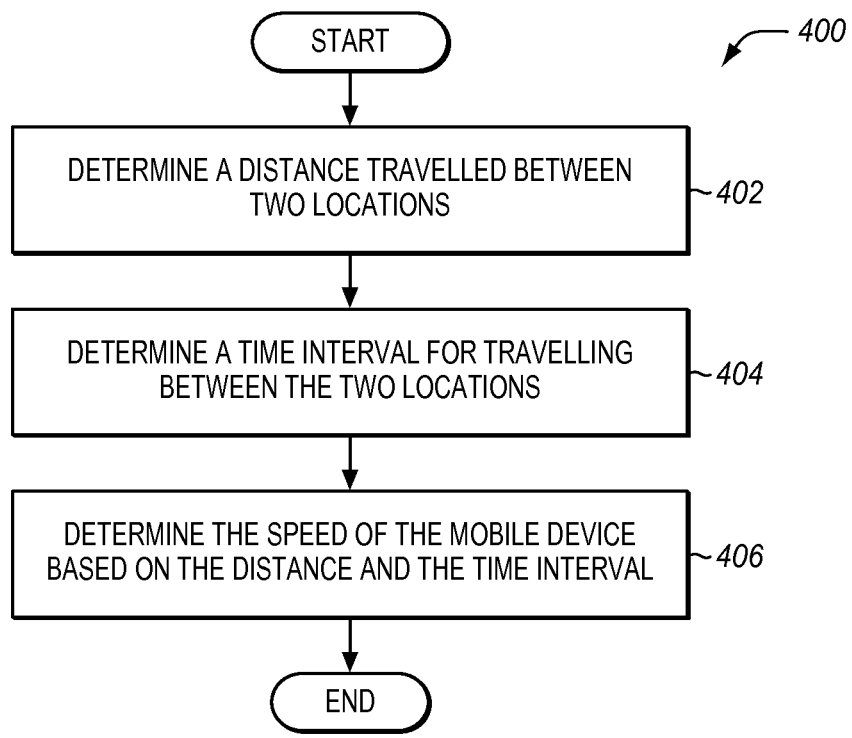
FIG. 4 is a flow chart illustrating a method of determining the speed of a mobile device in an exemplary embodiment.

In step 308, control system 204 determines or calculates a speed of mobile device 130 based on the locations indicated during the time period. One way of determining the speed of mobile device 130 is illustrated in FIG. 4 (method 400). In step 402 of FIG. 4, control system 204 determines a distance traveled between two of the locations identified for mobile device 130. Control system 204 may query map database 125 to determine the distance traveled between the two locations. In step 404, control system 204 determines a time interval for travelling between the two locations. Each time a location is identified, a corresponding time stamp is also identified. Thus, control system 204 is able to determine the time elapsed in travelling between the two locations. In step 406, control system 204 determines the speed of mobile device 130 based on the distance and the time interval.

In FIG. 3, after determining the speed of mobile device 130, control system 204 sends a notification message to third party 140 that includes an indication of the speed of mobile device 130 in step 310. The indication of the speed may comprise an indication of the actual speed (i.e., miles per hour (mph)) of mobile device 130 as determined by control system 204. For example, the notification message may state "The user of device NPA-NXX-0000 is traveling at 50 MPH". Control system 204 may send the notification message to third party 140 in a Short Message Service (SMS) message, a Multimedia Message Service (MMS) message, an email message, an Instant Message (IM), or some other message requested by third party 140.

Figure 5:
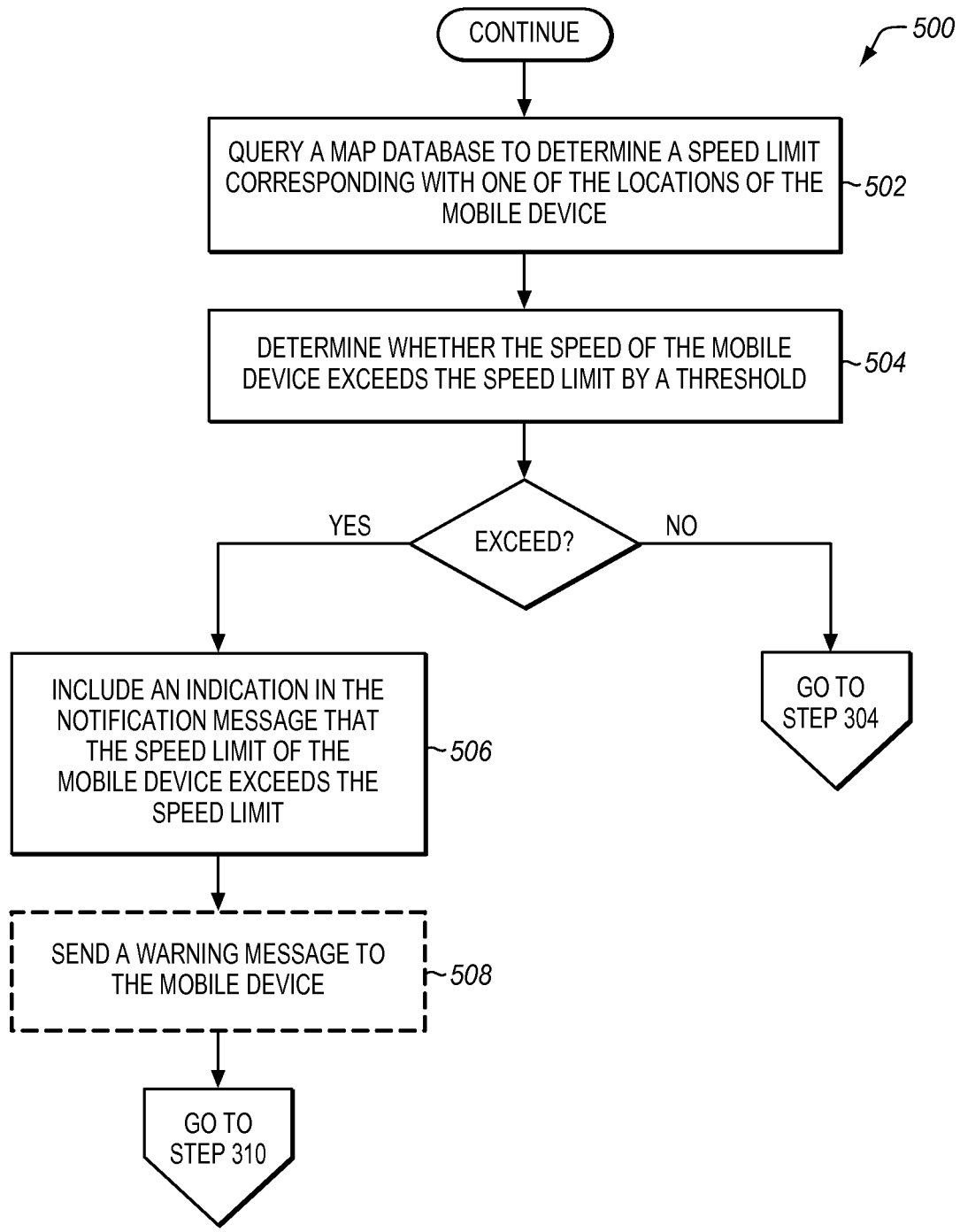
FIG. 5 is a flow chart illustrating a method of identifying excessive speed by a mobile device in an exemplary embodiment.

Because roadways have different speed limits, speed monitoring system 120 may determine whether or not the user of mobile device 130 is exceeding a speed limit as is illustrated in FIG. 5. FIG. 5 is a flow chart illustrating a method 500 of identifying excessive speed by mobile device 130 in an exemplary embodiment. In step 502, control system 204 queries map database 125 to determine a speed limit corresponding with one of the locations of mobile device 130. In step 504, control system 204 determines whether the speed of mobile device 130 exceeds the speed limit by a threshold. The threshold may be 0 mph, 5 mph, 10 mph, or some other configurable threshold. If the speed of mobile device 130 exceeds the speed limit by the threshold, then control system 204 includes an indication in the notification message that the speed of mobile device 130 exceeds the speed limit in step 506. For example, the notification message may state "The user of device NPA-NXX-0000 is exceeding the speed limit".

In optional step 508, control system 204 may send a warning message, through network interface 202, to mobile device 130 indicating that the user of mobile device 130 is exceeding the speed limit. Control system 204 sends the warning message to mobile device 130 over mobile network 110. The warning message may comprise an SMS message, an MMS message, an email message, an IM message, etc.

In yet another embodiment, third party 140 may only want to be notified when the user of mobile device 130 is speeding.

Thus, control system 204 may perform steps 502 and 504 in FIG. 5 to determine whether or not the speed of mobile device 130 exceeds the speed limit by the threshold. Responsive to a determination that the speed of mobile device 130 exceeds the speed limit by the threshold (see step 504 in FIG. 5), then control system 204 sends the notification message to third party 140 (see step 310 of FIG. 3). If the determination is that the speed of mobile device 130 does not exceed the speed limit by the threshold, then control system 204 does not send the notification message (see step 310 of FIG. 3) to third party 140 and continues to monitor the speed of mobile device 130 (see step 304 in FIG. 3).

After providing the initial notification, speed monitoring system 120 may continue to monitor the speed of mobile device 130 by periodically querying mobile network 110 as described above. The process(es) described in the above flow charts may be repeated until third party 140 terminates the speed monitoring service, until mobile device 130 is turned off, or responsive to some other event.

Speed monitoring system 120 advantageously provides a network-based service for monitoring the speed of the user of a mobile device. No special application needs to be downloaded to the mobile device to implement the service, as speed monitoring system 120 can acquire the needed information from mobile network 110. The service allows parents, companies, etc, to remotely monitor the speed of mobile user to ensure that a vehicle is being operated in a safe manner by the mobile user.

EXAMPLE

Figure 6:
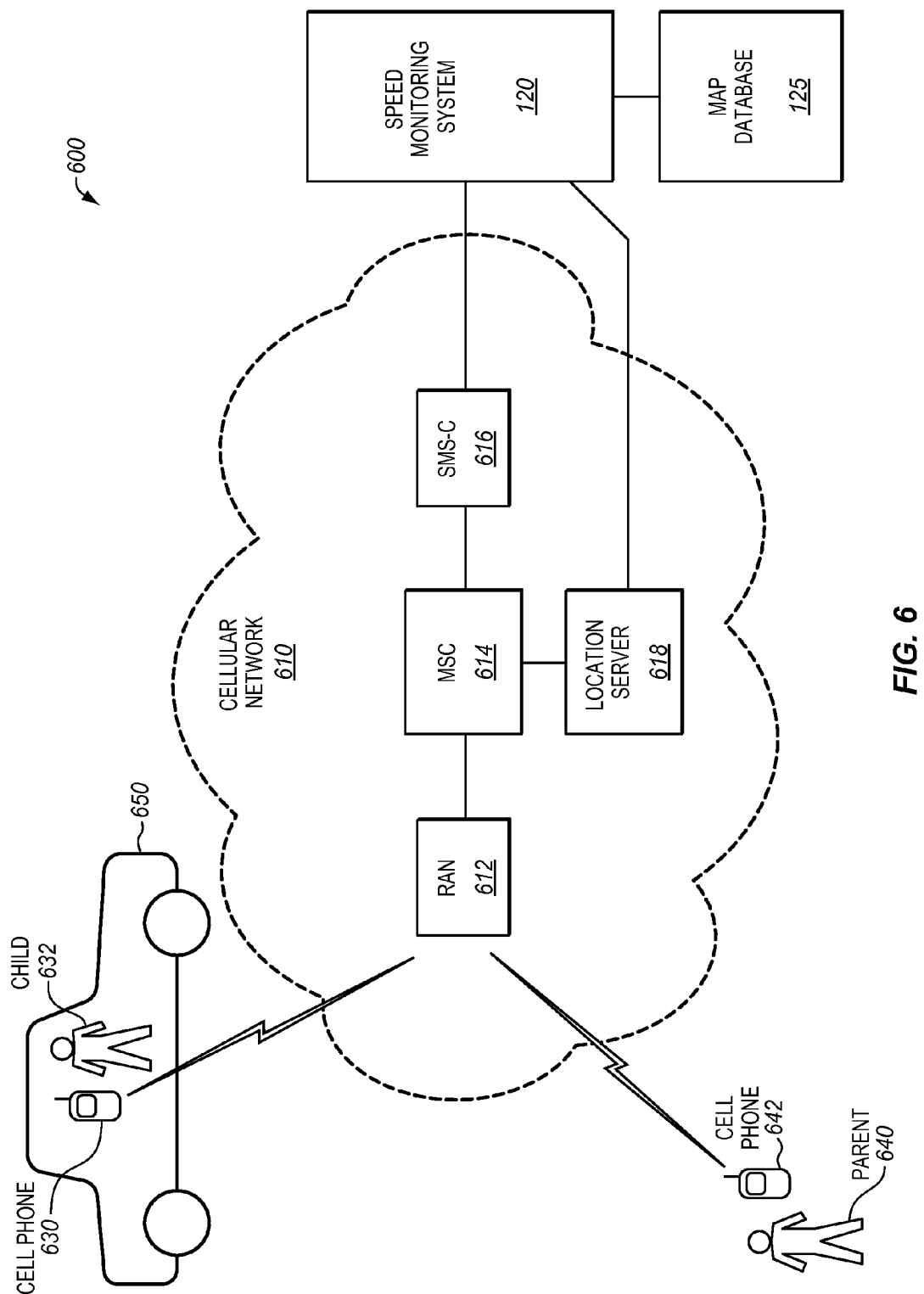
FIG. 6 illustrates another communication network in an exemplary embodiment.

FIG. 6 illustrates another communication network 600 in an exemplary embodiment. Communication network 600 includes a cellular network 610 operable to provide mobile communications to cell phone 630 and cell phone 642. Cellular network 610 includes a RAN 612, a Mobile Switching Center (MSC) 614, a Short Message Service Center (SMSC) 616, and a location server 618. Communication network 600 further includes speed monitoring system 120 and map database 125.

Assume for this example that a parent 640 has given cell phone 630 to a child 632 (i.e., a teenager). Further assume that parent 640 wants to monitor whether child 632 is speeding while driving or riding in vehicle 650. To do so, parent 640 may access a speed monitoring service provided by speed monitoring system 120 to monitor the child's speed.

Figure 7:
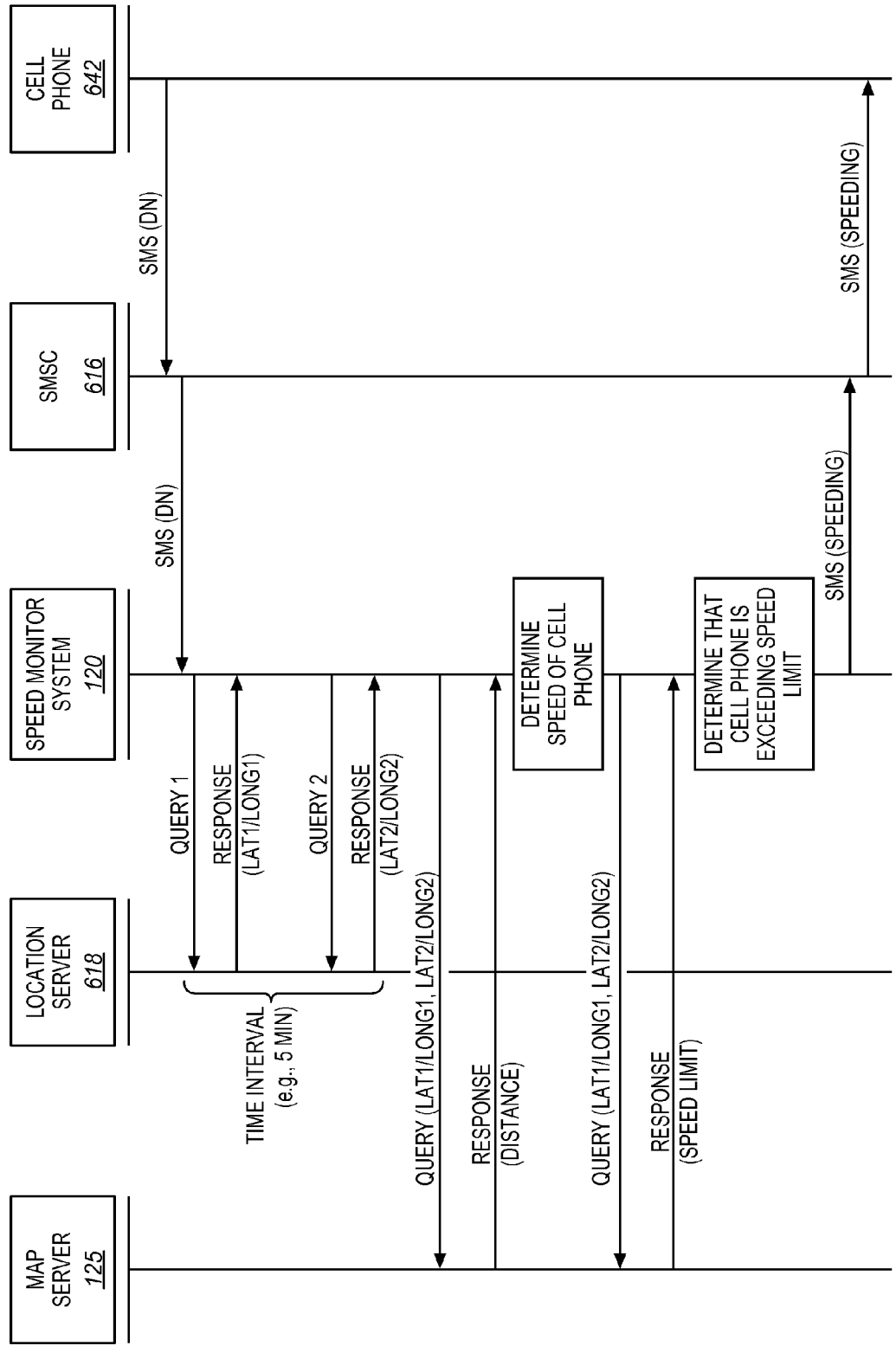
FIG. 7 is a message diagram that illustrates the monitoring of the speed of a cell phone in an exemplary embodiment.

FIG. 7 is a message diagram that illustrates the monitoring of the speed of cell phone 630 in an exemplary embodiment. To access the speed monitoring service, parent 640 sends an SMS message to cellular network 610 through cell phone 642 that requests monitoring of the speed of cell phone 630. The SMS message indicates the directory number (DN) for cell phone 630 to monitor. SMSC 616 receives the SMS message destined for speed monitoring system 120, and stores the SMS message. SMSC 616 then forwards the SMS message to speed monitoring system 120 according to SMS protocol.

In response to receiving the SMS message, speed monitoring system 120 transmits a first query to location server 618 for the present location of cell phone 630. In response to the first query, location server 618 identifies the location of cell phone 630, and responds to speed monitoring system 120 with a first location, such as a latitude and longitude. After a time interval, speed monitoring system 120 transmits a second query to location server 618 for the present location of cell phone 630. In response to the second query, location server 618 identifies the location of cell phone 630, and responds to speed monitoring system 120 with a second location.

Next, speed monitoring system 120 transmits a query to map database 125 for the distance between the two locations identified for cell phone 630. The query to map database 125 includes the two locations (i.e., lat1/long1, lat2/long2). In response to the query, map database 125 determines the distance between the two locations, and responds to speed monitoring system 120 with the distance.

Speed monitoring system 120 receives the response from map database 125, and determines or calculates the speed of cell phone 630. To do so, speed monitoring system 120 divides the distance between the two locations by the time interval, which results in a speed (e.g., mph).

After determining the speed of travel of cell phone 630, speed monitoring system 120 determines whether cell phone 630 is exceeding a speed limit. In other words, speed monitoring system 120 determines whether child 632 is exceeding the speed limit either as the driver of vehicle 650 or a passenger in vehicle 650. To do so, speed monitoring system 120 transmits a query to map database 125 to identify the speed limit of a road that corresponds with the location(s) of cell phone 630. For example, if the first and second locations identified for cell phone 630 correspond with Interstate 70, then map database 125 is able to determine that the speed limit on this road is 75 mph. In response to the query, map database 125 determines the speed limit for the road, and responds to speed monitoring system 120 with the speed limit.

Figure 8:
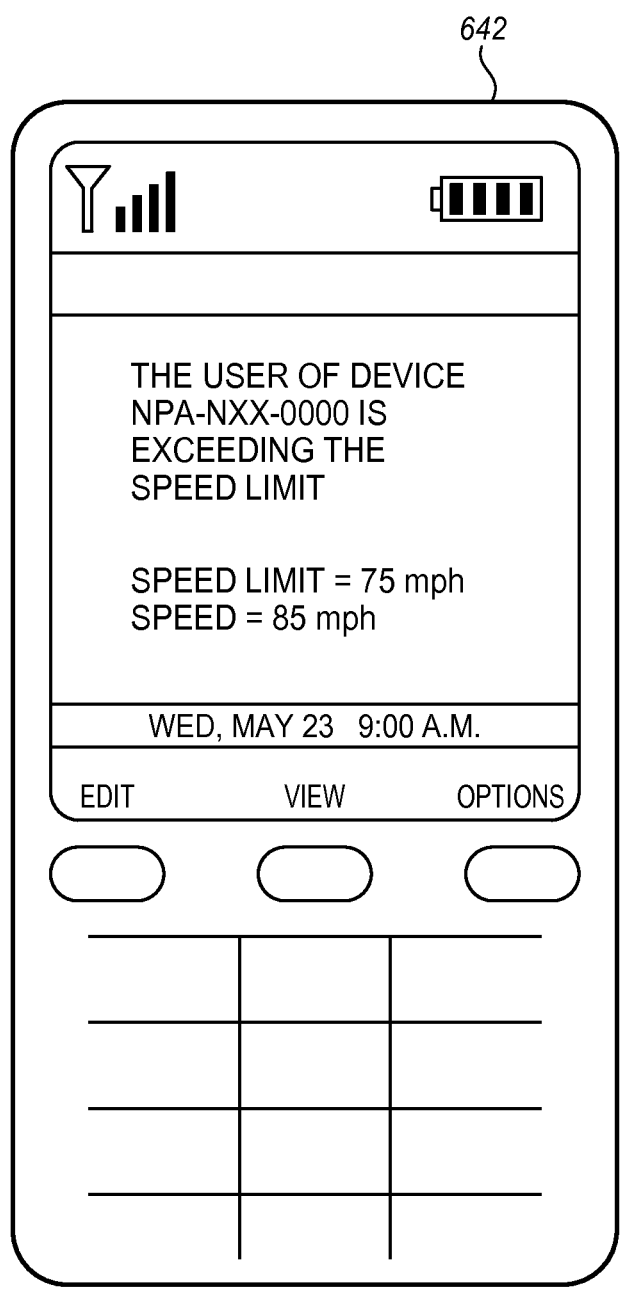
FIG. 8 illustrates an exemplary SMS message that may be displayed to a parent in an exemplary embodiment.

Speed monitoring system 120 then determines whether the speed of cell phone 630 exceeds the speed limit of the road by a threshold. For example, parents 640 may set the threshold to be 5 mph over the speed limit. If child 632 is traveling 85 mph, then speed monitoring system 120 determines that the speed (85 mph) for cell phone 630 exceeds the speed limit (75 mph) by the threshold. Thus, speed monitoring system 120 determines that child 632 is speeding in vehicle 650. In response to this determination, speed monitoring system 120 generates an SMS message as a notification that includes an indication that child 632 is exceeding the speed limit. Speed monitoring system 120 then sends the SMS message to SMSC 616. SMSC 616 receives the SMS message destined for cell phone 642, and stores the SMS message. SMSC 616 then forwards the SMS message to cell phone 642 of parent 640 according to SMS protocol. Parent 640 is thus notified that child 632 is speeding. The SMS message may also indicate the speed of child 632. FIG. 8 illustrates an exemplary SMS message that may be displayed to parent 640 in an exemplary embodiment. The SMS message states that "The user of device NPA-NXX-0000 is exceeding the speed limit". The SMS message may also state the present speed of cell phone 630 and the speed limit.

After providing the initial notification, speed monitoring system 120 may continue to monitor the speed of cell phone 630 by periodically querying location server 618 as described above. If cell phone 630 if found to be speeding again, then speed monitoring system 120 may send another SMS message to cell phone 642 of parent 640. This process may continue until parent 640 terminates the service.

Any of the various elements shown in the figures or described herein may be implemented as hardware, software, firmware, or some combination of these. For example, an element may be implemented as dedicated hardware. Dedicated hardware elements may be referred to as "processors", "controllers", or some similar terminology. When provided by a processor, the functions may be provided by a single dedicated processor, by a single shared processor, or by a plurality of individual processors, some of which may be shared. Moreover, explicit use of the term "processor" or "controller" should not be construed to refer exclusively to hardware capable of executing software, and may implicitly include, without limitation, digital signal processor (DSP) hardware, a network processor, application specific integrated circuit (ASIC) or other circuitry, field programmable gate array (FPGA), read only memory (ROM) for storing software, random access memory (RAM), non volatile storage, logic, or some other physical hardware component or module.

Also, an element may be implemented as instructions executable by a processor or a computer to perform the functions of the element. Some examples of instructions are software, program code, and firmware. The instructions are operational when executed by the processor to direct the processor to perform the functions of the element. The instructions may be stored on storage devices that are readable by the processor. Some examples of the storage devices are digital or solid-state memories, magnetic storage media such as a magnetic disks and magnetic tapes, hard drives, or optically readable digital data storage media.

Although specific embodiments were described herein, the scope of the invention is not limited to those specific embodiments. The scope of the invention is defined by the following claims and any equivalents thereof.

We claim:

1. A speed monitoring system comprising:
a network interface operable to receive a request from a third party to monitor a speed of a mobile device; and
a control system operable to periodically query a mobile network through the network interface for locations of the mobile device over a time period, and to receive responses from the mobile network through the network interface indicating the locations of the mobile device during the time period;
the control system is further operable to determine a distance traveled between two of the locations, to determine a time interval for travelling between the two locations, and to determine the speed of the mobile device based on the distance and the time interval;
the control system is further operable to query a map database to determine a speed limit corresponding with one of the locations of the mobile device, to determine whether the speed of the mobile device exceeds the speed limit by a threshold, and to send a notification message to the third party responsive to a determination that the speed of the mobile device exceeds the speed limit by the threshold.

2. The speed monitoring system of claim 1 wherein:
the control system is further operable to query a map database to determine the distance traveled between the two locations.

3. The speed monitoring system of claim 1 wherein:
the control system is further operable to send a warning message to the mobile device through the network interface indicating that the mobile device is exceeding the speed limit.

4. The speed monitoring system of claim 1 wherein:
the control system is further operable to send the notification message to the third party in a Short Message Service (SMS) message.

5. The speed monitoring system of claim 1 wherein:
the control system is further operable to send the notification message to the third party in an email message.

6. The speed monitoring system of claim 1 wherein:
the control system is further operable to send the notification message to the third party in an Instant Message (IM).

7. A method comprising:
receiving a request from a third party to monitor a speed of a mobile device;
periodically querying a mobile network for locations of the mobile device over a time period;
receiving responses from the mobile network indicating the locations of the mobile device during the time period;
determining a distance traveled between two of the locations;
determining a time interval for travelling between the two locations;
determining the speed of the mobile device based on the distance and the time interval;
querying a map database to determine a speed limit corresponding with one of the locations of the mobile device;
determining whether the speed of the mobile device exceeds the speed limit by a threshold; and
sending a notification message to the third party responsive to a determination that the speed of the mobile device exceeds the speed limit by the threshold.

8. The method of claim 7 wherein determining a distance traveled between two of the locations comprises:
querying a map database to determine the distance traveled between the two locations.

9. The method of claim 7 further comprising:
sending a warning message to the mobile device indicating that the mobile device is exceeding the speed limit.

10. The method of claim 7 wherein sending the notification message to the third party comprises:
sending the notification message to the third party in a Short Message Service (SMS) message.

11. The method of claim 7 wherein sending the notification message to the third party comprises:
sending the notification message to the third party in an email message.

12. The method of claim 7 wherein sending the notification message to the third party comprises:
sending the notification message to the third party in an Instant Message (IM).

13. A speed monitoring system comprising:
a network interface operable to receive a Short Message Service (SMS) message from a third party over a mobile network, wherein the SMS message requests to monitor a speed of a mobile device; and
a control system operable to periodically query a location server in the mobile network through the network interface for locations of the mobile device over a time period, to receive responses from the location server through the network interface indicating the locations of the mobile device during the time period;
the control system is further operable to determine a distance traveled between two of the locations, to determine a time interval for travelling between the two locations, and to determine the speed of the mobile device based on the distance and the time interval;
the control system is further operable to determine a speed limit corresponding with one of the locations of the mobile device, to determine whether the speed of the mobile device exceeds the speed limit by a threshold, and to send a notification message to the third party responsive to a determination that the speed of the mobile device exceeds the speed limit by the threshold.

14. The speed monitoring system of claim 13 wherein:
the control system is further operable to send the notification message to the third party in an SMS message.

15. The speed monitoring system of claim 13 wherein:
the control system is further operable to send the notification message to the third party in an email message.

16. The speed monitoring system of claim 13 wherein:
the control system is further operable to send the notification message to the third party in an Instant Message (IM).

* * * * *